(12) United States Patent  
Benhase et al.

(10) Patent No.: US 8,949,528 B2  
(45) Date of Patent: *Feb. 3, 2015

(54) WRITING OF DATA OF A FIRST BLOCK SIZE IN A RAID ARRAY THAT STORES AND MIRRORS DATA IN A SECOND BLOCK SIZE

(75) Inventors: Michael T. Benhase, Tucson, AZ (US); Akihiro Nose, Yokohama (JP); Masaru Sugiura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/463,122

(22) Filed: May 3, 2012

(65) Prior Publication Data

US 2012/0303893 A1    Nov. 29, 2012

Related U.S. Application Data

(63) Continuation of application No. 13/113,562, filed on May 23, 2011.

(51) Int. Cl.  
*G06F 12/00* (2006.01)  
*G06F 11/10* (2006.01)

(52) U.S. Cl.  
CPC ............... *G06F 12/00* (2013.01); *G06F 11/10* (2013.01)  
USPC ......................................................... 711/114

(58) Field of Classification Search  
CPC . G06F 12/00; G06F 12/0246; G06F 12/0866; G06F 12/0868; G06F 21/64; G06F 2212/1009; G06F 11/2056; G06F 11/1076; G06F 11/1453; G06F 11/2089; G06F 11/1064; G06F 11/1409; G06F 3/0689; G06F 3/061; G06F 3/0608; G06F 3/0641; G06F 3/067; G06F 3/0647; G06F 3/0661; G06F 3/064  
USPC ......................................................... 711/114  
See application file for complete search history.

(56) References Cited

U.S. PATENT DOCUMENTS

| | | | | |
|---|---|---|---|---|
| 5,206,939 | A | * | 4/1993 | Yanai et al. ........................ 711/4 |
| 7,080,200 | B2 | * | 7/2006 | Hassner et al. ................ 711/114 |
| 7,827,434 | B2 | | 11/2010 | D'Souza et al. |
| 8,112,663 | B2 | * | 2/2012 | S et al. ........................ 714/6.24 |
| 8,255,661 | B2 | | 8/2012 | Karr et al. |
| 8,291,190 | B2 | | 10/2012 | Watanabe |

(Continued)

OTHER PUBLICATIONS

Response dated Dec. 11, 2012, pp. 1-2, to UK Combined Search and Examination Report dated Aug. 24, 2012 for Application No. GB1208691.4 filed May 17, 2012.

(Continued)

*Primary Examiner* — Reginald Bragdon  
*Assistant Examiner* — Hannah A Faye-Joyner  
(74) *Attorney, Agent, or Firm* — Rabindranath Dutta; Konrad Raynes Davda & Victor LLP

(57) ABSTRACT

Data that is to be written is received, wherein the data is indicated in one or more blocks of a first block size. Each of the one or more blocks of the first block size is written in consecutive blocks of a second block size that is larger in size than the first block size, wherein each of the consecutive blocks of the second block size stores only one block of the first block size, and wherein each of the consecutive blocks of the second block size has empty space remaining, subsequent to the writing of each of the one or more blocks of the first block size. Filler data is written in the empty space remaining in each of the consecutive blocks of the second block size.

16 Claims, 10 Drawing Sheets

(56) References Cited

U.S. PATENT DOCUMENTS

| | | | |
|---|---|---|---|
| 8,407,446 B2* | 3/2013 | Forrer et al. | 711/171 |
| 2005/0036381 A1 | 2/2005 | Hassner et al. | |
| 2005/0071557 A1* | 3/2005 | Kawamura et al. | 711/114 |
| 2006/0123268 A1 | 6/2006 | Forhan et al. | |
| 2009/0006725 A1 | 1/2009 | Ito et al. | |
| 2009/0063768 A1 | 3/2009 | Kalos et al. | |
| 2009/0259924 A1 | 10/2009 | Amann et al. | |
| 2009/0300466 A1* | 12/2009 | Yoshimura | 714/769 |
| 2010/0199053 A1 | 8/2010 | Otani et al. | |
| 2011/0119464 A1* | 5/2011 | Karr et al. | 711/171 |

OTHER PUBLICATIONS

Preliminary Amendment 1, Jul. 21, 2011, for U.S. Appl. No. 13/113,546, filed May 23, 2011 by M.T. Benhase et al., Total 13 pp.
Preliminary Amendment 2, Apr. 30, 2012, for U.S. Appl. No. 13/113,546, filed May 23, 2011 by M.T. Benhase et al., Total 8 pp.
Preliminary Amendment, Apr. 30, 2012, for No. U.S. Appl. No. 13/460,493, filed Apr. 30, 2012 by M.T. Benhase et al., Total 19 pp.
Preliminary Amendment 1, Jul. 21, 2011, for U.S. Appl. No. 13/113,562, filed May 23, 2011 by M.T. Benhase et al., Total 13 pp.
Preliminary Amendment, May 3, 2012, for U.S. Appl. No. 13/113,562, filed May 23, 2011 by M.T. Benhase et al., Total 7 pp.
U.S. Appl. No. 13/113,546, filed May 23, 2011, entitled "Writing of Data of a First Block Size in a Raid Array that Stores and Mirrors Data in a Second Block Size" invented by M.T. Benhase, R. Galbraith, I.D. Judd, D.F. Moertl, and R.C. Nielsen, Total 39 pp.
U.S. Appl. No. 13/460,493, filed Apr. 30, 2012, entitled "Writing of Data of a First Block Size in a Raid Array that Stores and Mirrors Data in a Second Block Size" invented by M.T. Benhase, R. Galbraith, I.D. Judd, D.F. Moertl, and R.C. Nielsen, Total 39 pp.
U.S. Appl. No. 13/113,562, filed May 23, 2011, entitled "Writing of Data of a First Block Size in a Raid Array that Stores and Mirrors Data in a Second Block Size", invented by Benhase, M.T., A. Akihiro, and M. Sugiura, Total 36 pp.
UK Combined Search and Examination Report dated Aug. 24, 2012 for Application No. GB1208691.4 filed May 17, 2012.
Response dated Oct. 1, 2013, pp. 15, to Office Action dated Jul. 1, 2013, pp. 29, for U.S. Appl. No. 13/113,562, filed May 23, 2011 by inventors M.T. Benhase, et al.
Office Action dated Oct. 16, 2013, pp. 47 for U.S. Appl. No. 13/113,546, filed May 23, 2011.
Office Action dated Oct. 16, 2013, pp. 39 for U.S. Appl. No. 13/460,493, filed Apr. 30, 2012.
Response dated Jan. 16, 2014, pp. 15, to Office Action dated Oct. 16, 2013, pp. 47 for U.S. Appl. No. 13/113,546, filed May 23, 2011.
Response dated Jan. 16, 2014, pp. 11, to Office Action dated Oct. 16, 2013, pp. 39 for U.S. Appl. No. 13/460,493, filed Apr. 30, 2012.
Office Action dated Dec. 24, 2013, pp. 23, for U.S. Appl. No. 13/113,562, filed May 23, 2011.
Final Office Action dated Mar. 28, 2014, pp. 29 for U.S. Appl. No. 13/460,493, filed Apr. 30, 2012.
Final Office Action dated Mar. 28, 2014, pp. 30 for U.S. Appl. No. 13/113,546, filed May 23, 2011.
Response dated Jun. 30, 2014, pp. 15, to Final Office Action dated Mar. 28, 2014, pp. 30 for U.S. Appl. No. 13/113,546, filed May 23, 2011.
Response dated Jun. 30, 2014, pp. 12, to Final Office Action dated Mar. 28, 2014, pp. 29 for U.S. Appl. No. 13/460,493, filed Apr. 30, 2012.
Supplemental Amendment filed Apr. 18, 2014, pp. 11 for U.S. Appl. No. 13/113,562, filed May 23, 2011.
Supplemental Amendment filed Apr. 29, 2014, pp. 12 for U.S. Appl. No. 13/113,562, filed May 23, 2011.
Notice of Allowance dated Jun. 4, 2014 pp. 20, for U.S. Appl. No. 13/113,562, filed May 23, 2011.
Supplemental Response dated Jul. 29, 2014, pp. 13, to Final Office Action dated Mar. 28, 2014, pp. 30 for U.S. Appl. No. 13/113,546, filed May 23, 2011.
Supplemental Response dated Jul. 29, 2014, pp. 10, to Final Office Action dated Mar. 28 2014, pp. 29 for U.S. Appl. No. 13/460,493, filed Apr. 30, 2012.
Office Action dated Aug. 15, 2014, pp. 26 for U.S. Appl. No. 13/113,546, filed May 23, 2011.
Office Action dated Aug. 15, 2014, pp. 24 for U.S. Appl. No. 13/460,493, filed Apr. 30, 2012.
Notice of Allowance dated Sep. 23, 2014, pp. 13, U.S. Appl. No. 13/113,562, filed May 23, 2011.
Response dated Nov. 17, 2014, pp. 17, to Office Action dated Aug. 15, 2014, pp. 26 for U.S. Appl. No. 13/113,546, filed May 23, 2011.
Response dated Nov. 17, 2014, pp. 13, to Office Action dated Aug. 15, 2014, pp. 24 for U.S. Appl. No. 13/460,493, filed Apr. 30, 2012.

* cited by examiner

WRITING OF DATA OF A FIRST BLOCK SIZE IN A RAID ARRAY THAT STORES AND MIRRORS DATA IN A SECOND BLOCK SIZE

CROSS-REFERENCE TO RELATED APPLICATION

This application is a continuation of U.S. patent application Ser. No. 13/113562, filed May 23, 2011, which application is incorporated herein by reference in its entirety.

BACKGROUND

1. Field

The disclosure relates to a method, system, and article of manufacture for the writing of data of a first block size in a Redundant Array of Independent Disks (RAID) array that stores and mirrors data in a second block size.

2. Background

Redundant Array of Independent Disks (RAID) is a category of disk drives that combine two or more disk drives to provide fault tolerance for data. RAID allows for the redundant storage of the same data across a plurality of disks. In certain configurations of RAID, such as RAID-10 data may be mirrored to recover from a failure of a disk. The physical disks of a RAID may be said to be in a RAID array that may be addressed by an operating system as one single disk. Data may be written in stripes in a RAID array, wherein data striping is the spreading out of blocks of each file across a plurality of disk drives.

RAID-10 provides high availability by combining features of RAID-0 and RAID-1. RAID-0 increases performance by striping volume data across multiple disk drives. RAID-1 provides disk mirroring which duplicates data between two disk drives. By combining the features of RAID-0 and RAID-1, RAID-10 provides a second optimization for fault tolerance. RAID-10 may provide data mirroring from one disk drive module (DDM) to another DDM. RAID 10 stripes data across half of the disk drives in the RAID-10 configuration. The other half of the array mirrors the first set of disk drives. Access to data is preserved if one disk in each mirrored pair remains available.

In some cases, RAID-10 offers faster data reads and writes than RAID configurations such as RAID 5 because RAID-10 does not need to manage parity. However, with half of the DDMs in the group used for data and the other half used to mirror that data, RAID-10 disk groups may not use storage space very efficiently.

A sector is a specifically sized division of a disk. Previously, one sector of a disk was generally configured to hold 512 bytes of information. However, recently certain disks are being configured to hold 4096 bytes (i.e., 4 Kilobyte) of information by disk manufacturers.

A block is a group of sectors of a disk that an operating system can address. Count-key-data (CKD) is a disk data organization model of certain operating systems in which the disk is assumed to be comprised of a fixed number of tracks, each having a maximum data capacity. Multiple records of varying length may be written on each track of a CKD disk, and the usable capacity of each track depends on the number of records written to the track. CKD architecture derives its name from the record format, which comprises a field containing the number of bytes of data and a record address, an optional key field, and the data itself. CKD records are stored in 512 byte blocks.

SUMMARY OF THE PREFERRED EMBODIMENTS

Provided are a method, a system, and a computer program product in which data that is to be written is received, wherein the data is indicated in one or more blocks of a first block size. Each of the one or more blocks of the first block size is written in consecutive blocks of a second block size that is larger in size than the first block size, wherein each of the consecutive blocks of the second block size stores only one block of the first block size, and wherein each of the consecutive blocks of the second block size has empty space remaining, subsequent to the writing of each of the one or more blocks of the first block size. Filler data is written in the empty space remaining in each of the consecutive blocks of the second block size.

In further embodiments, the writing of each of the one or more blocks and the writing of the filler data is performed by a Redundant Array of Independent Disks (RAID) controller, and wherein the RAID controller controls disks that are configured as a RAID-10. The consecutive blocks of the second block size are mirrored from one disk to another disk.

In yet further embodiments the first block size is 512 bytes, and the second block size is 4 Kilobytes.

In still further embodiments, the data is received by the RAID controller from a host whose operating system is configured to access the blocks of the first block size of 512 bytes. The blocks of the first block size of 512 bytes store CKD records and each CKD record is aligned to a 512 byte block boundary.

In additional embodiments, the RAID controller controls a RAID configuration that mirrors data but does not store parity information. Additionally, the RAID configuration has greater tolerance for wasted storage space and lesser tolerance for increased processing time for executing read and write operations.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Mapping Data of 512 Byte Block Size Into 4 Kilobyte Blocks In RAID-10

Physical disks were previously configured into 512 byte sectors by disk manufacturers. Recently physical disks that are configured into 4 Kilobyte sectors have become available. However, certain disk data organization models such as CKD rely on operating system accesses via 512 byte blocks even when physical disks that are configured onto 4 Kilobyte blocks are used.

Certain embodiments provide a RAID controller that maps operating system requests to write 512 byte blocks into a RAID configuration that stores and performs mirroring of data in 4 Kilobyte blocks. Such RAID configurations may include RAID-10. Each 4 Kilobyte (i.e. 4096 bytes) block of the disks of the RAID configuration is configured to hold a 512 byte block of data and the remaining space of 3584 bytes are padded with filler data. As a result, considerable disk space is wasted because about seven-eighth's of the storage space of every block is padded with filler data, and the data itself is mirrored. However, the RAID-10 configuration does not lose any performance in comparison to the situation which the data to be written is of the same block size as the block size natively supported by the RAID configuration. Additionally, extra operations that indicate to the operating system that the RAID-10 configuration does not natively support 512 byte blocks do not have to be performed by the RAID controller. Neither hosts nor the disk drives of the RAID-10 system have to be aware of what block size is natively supported by the other. The RAID controller performs the mapping of blocks of a smaller block size used natively by the operating system of a host to blocks of a larger block size used natively by a RAID-10 configuration of disks.

Exemplary Embodiments

Figure 1:
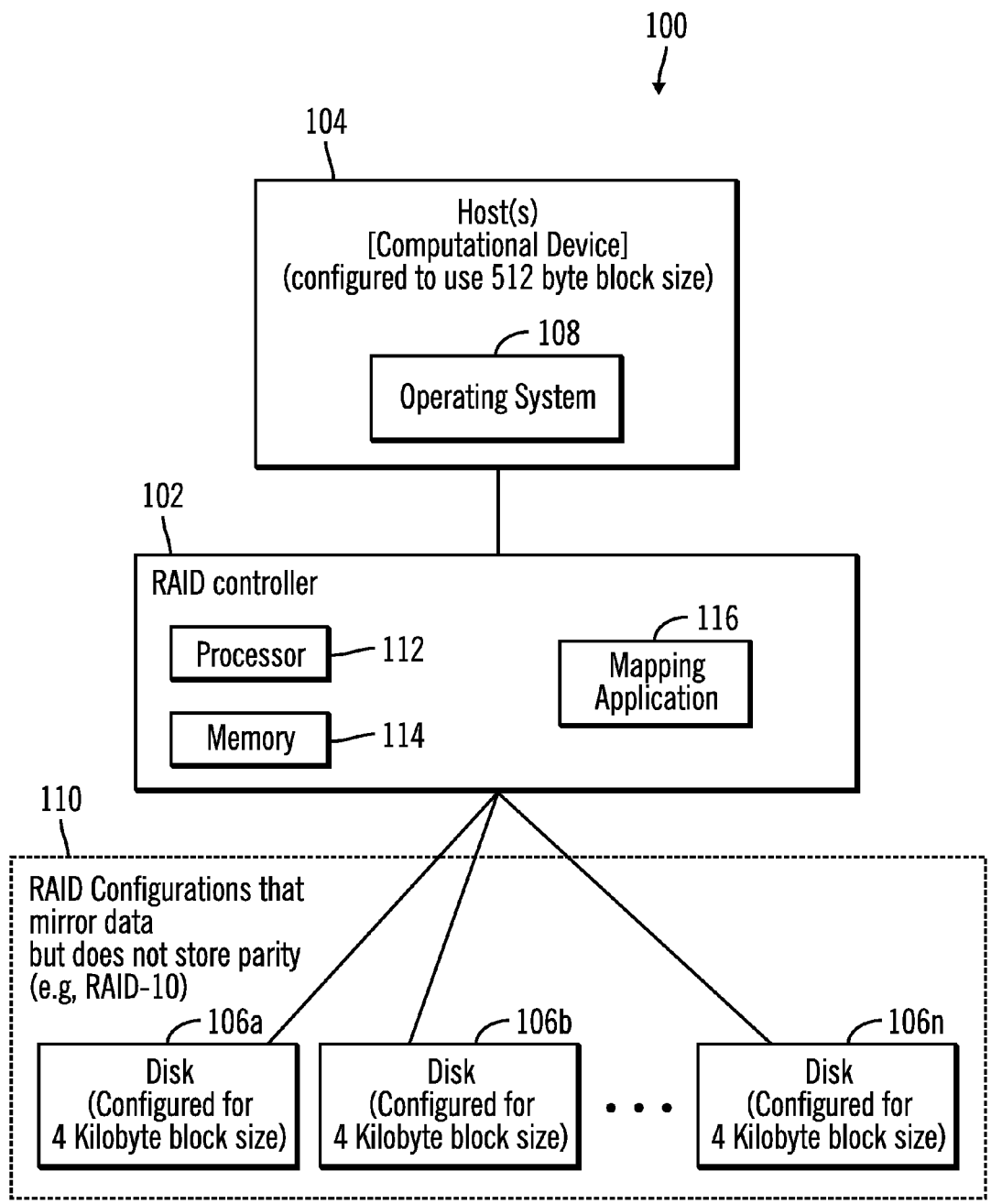
FIG. 1 illustrates a block diagram of a computing environment that includes a RAID controller coupled to a host and a plurality of disks configured in a RAID-10 configuration, in accordance with certain embodiments.

FIG. 1 illustrates a block diagram of a computing environment 100 that includes a RAID controller 102 coupled to one or more hosts 104 and a plurality of disks 106a, 106b, . . . , 106n configured in a RAID-10 configuration, in accordance with certain embodiments.

The RAID controller 102 and the hosts 104 may comprise any suitable computational device including those presently known in the art, such as, a personal computer, a workstation, a server, a mainframe, a hand held computer, a palm top computer, a telephony device, a network appliance, a blade computer, a server, etc. The plurality of disks 106a . . . 106n may comprise any suitable physical hard disks known in the art. In alternative embodiments, the plurality of disks 106a . . . 106n may comprise other types of disks such as solid state disks, optical disks, etc.

The host 104 may include an operating system 108 that is configured to use a 512 byte block size for accessing blocks. The plurality of disks 106a . . . 106n may be configured in any RAID configuration 110 that stores data but does not store parity, such as a RAID-10 configuration.

Each of the plurality of disks 106a . . . 106n is configured for a 4 Kilobyte block size. Reading and writing with respect to the plurality of disks 106a . . . 106m may therefore be performed in a block size of 4 Kilobytes. Therefore, in embodiments shown in FIG. 1, the plurality of disks 106a . . . 106n of the RAID configuration 110 are configured for a 4 Kilobyte block size whereas the host 104 is configured to use a 512 byte block size.

The RAID controller 102 includes a processor 112, a memory 114, and a mapping application 116. The mapping application 116 may be implemented in hardware, software, firmware or any combination thereof. The mapping application 116 interprets input/output (I/O) requests for 512 byte blocks from the host 104 and maps such requests to read and write data with respect to the disks 106a . . . 106n in the RAID configuration 110. The reads and writes performed via the RAID controller 102 with respect to the disks 106a . . . 106n are all in multiples of 4 Kilobytes in size, as the plurality of disks 106a . . . 106n of the RAID configuration 110 are configured for a 4 Kilobyte block size.

The host 104 does not have to be informed by the RAID controller 102 as to whether or not the RAID configuration 110 supports the 512 byte block size used by the operating system 108 of the host 104.

Figure 2:
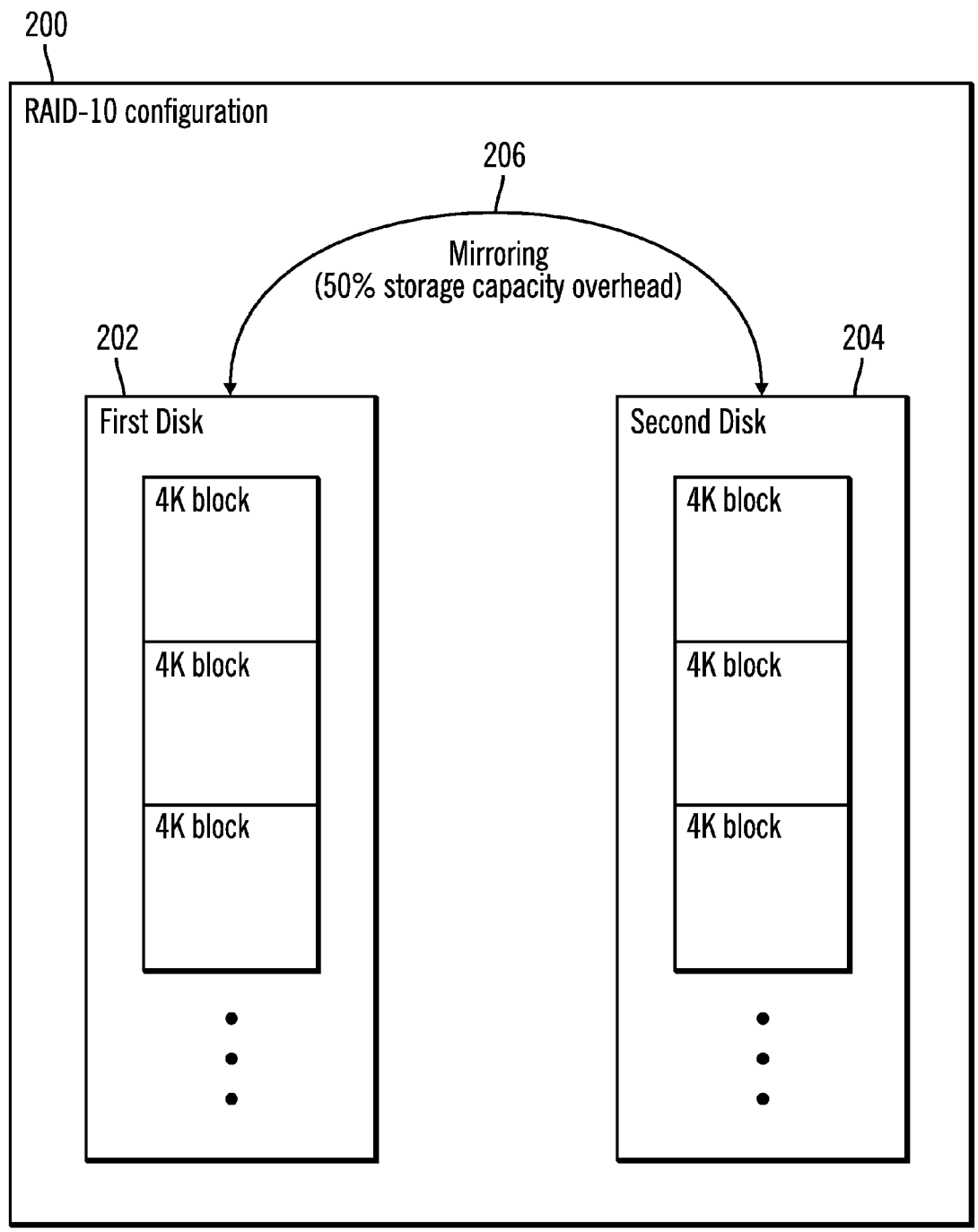
FIG. 2 illustrates a block diagram that shows a RAID-10 configuration in which disks are configured into 4 Kilobyte sized blocks, in accordance with certain embodiments.

FIG. 2 illustrates a block diagram that shows a RAID-10 configuration 200 in which disks are configured into 4 Kilobyte sized blocks, in accordance with certain embodiments. A first disk 202 that is configured into 4 Kilobyte blocks is mirrored (reference numeral 206) into a second disk 204 that is also configured into 4 Kilobyte blocks. The mirroring within the RAID-10 configuration mirrors only data, and no parity is maintained. Therefore, about 50% of the storage space is wasted in order to achieve data redundancy. In case of failure of one disk, the other disk can take over operations without loss of any data.

Figure 3:
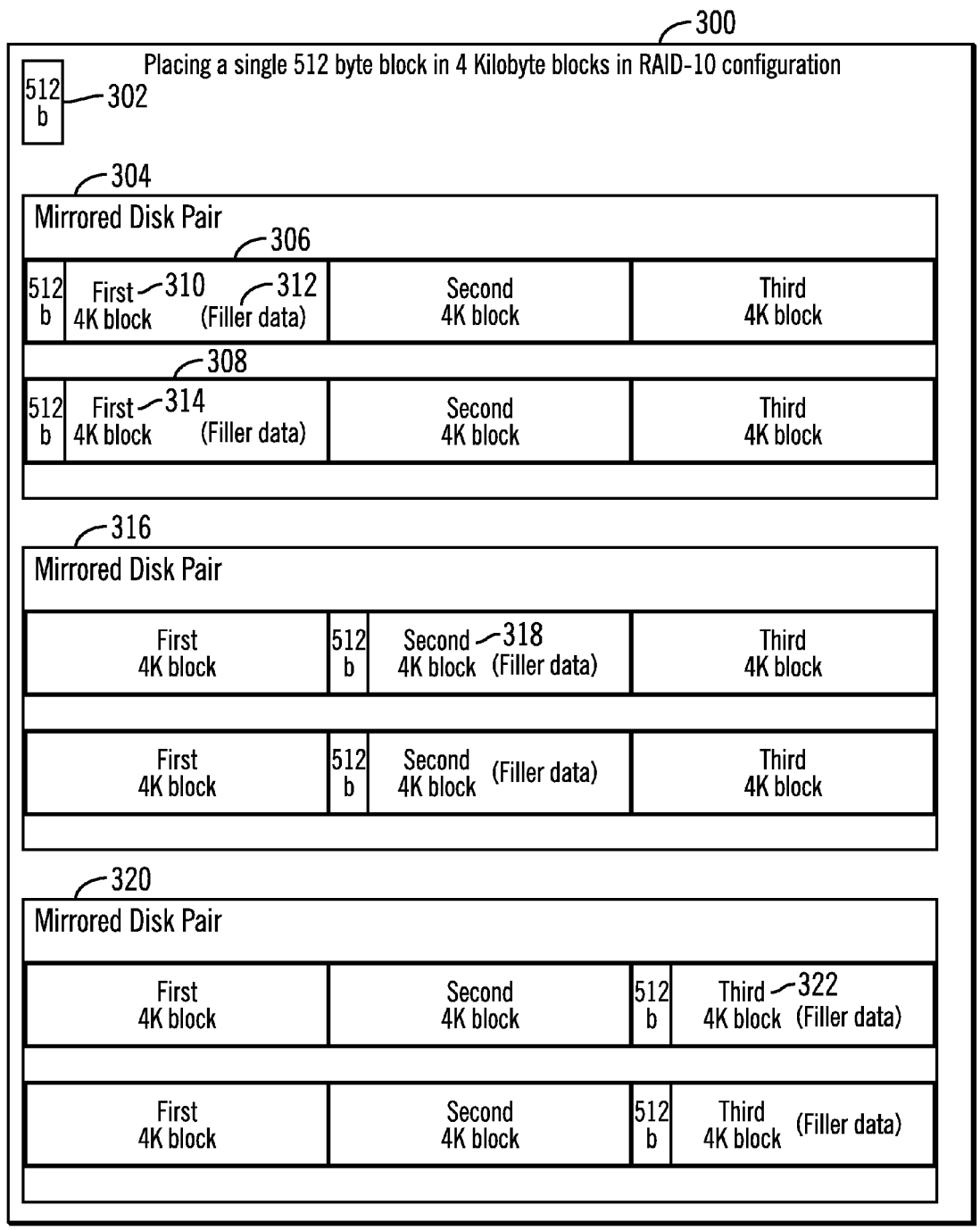
FIG. 3 illustrates a block diagram that shows how one 512 byte block is placed in 4 Kilobyte blocks in a RAID-10 configuration, in accordance with certain embodiments.

FIG. 3 illustrates a block diagram 300 that shows how one 512 byte block 302 is placed in 4 Kilobyte blocks in a RAID-10 configuration, in accordance with certain embodiments.

In a configuration 304 of a mirrored disk pair, the 512 byte block is placed in the first 4 Kilobyte block 310 of a first disk 306 with filler data 312 placed in the space that is not occupied by the 512 byte block within the 4 Kilobyte block 310. The first disk 306 is mirrored to a second disk 308, such that the 512 byte block with the trailing filler data is also mirrored to a first 4 Kilobyte block 314 of the second disk 308.

Similarly, in the configuration 316 of the mirrored disk pair, the 512 byte block is placed with trailing filler data in the second 4 Kilobyte block 318 and then the second 4 Kilobyte block is mirrored. In the configuration 320 of the mirrored disk pair, the 512 byte block is placed with trailing filler data in the third 4 Kilobyte block 322 and then the third 4 Kilobyte block is mirrored. Therefore, only 512 byes of the 4 Kilobyte blocks of the RAID-10 configuration are used for storing data and the remaining space of the 4 Kilobyte blocks are stored with filler data.

Figure 4:
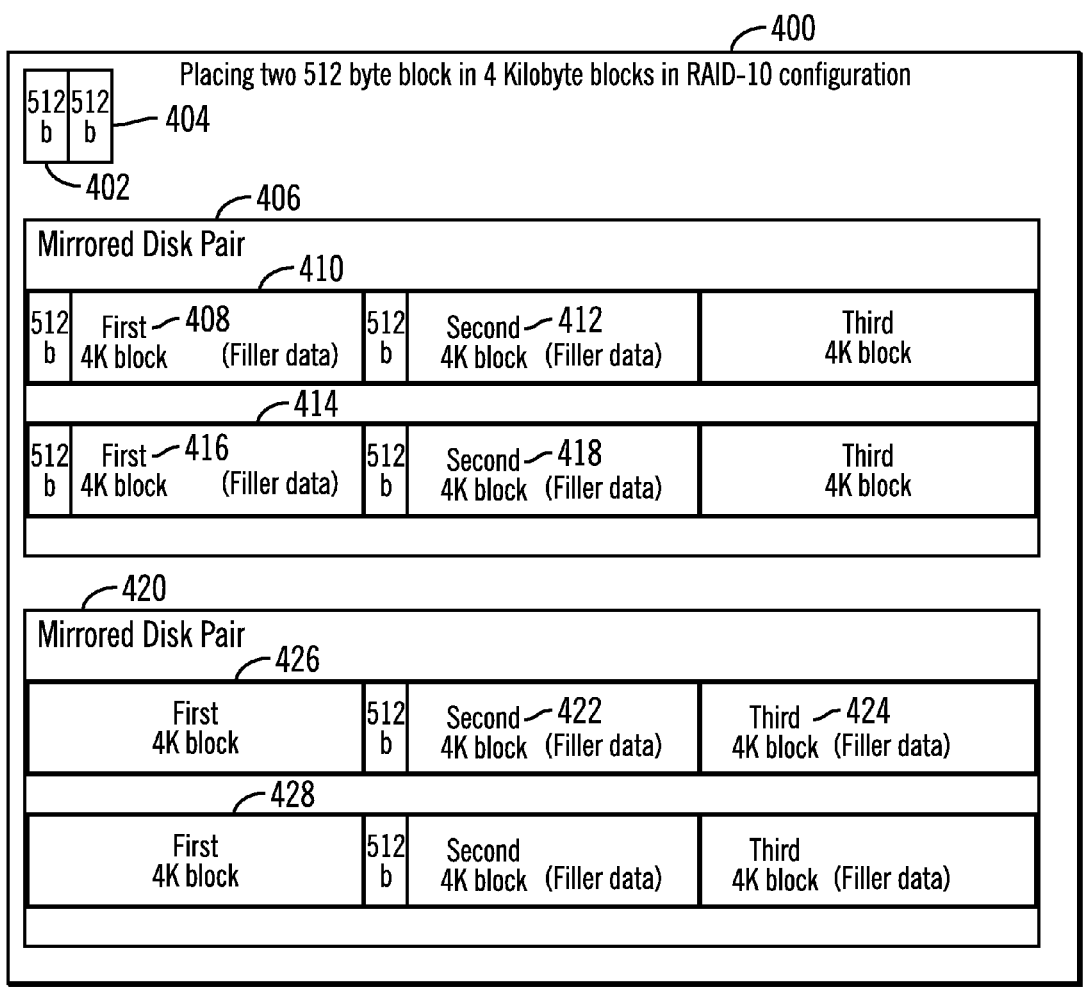
FIG. 4 illustrates a block diagram that shows how two 512 byte blocks are placed in 4 Kilobyte blocks in a RAID-10 configuration, in accordance with certain embodiments.

FIG. 4 illustrates a block diagram 400 that shows how two 512 byte blocks 402, 404 are placed in 4 Kilobyte blocks in a RAID-10 configuration, in accordance with certain embodiments.

In a configuration 406 of a mirrored disk pair, the 512 byte block 402 is placed in the first 4 Kilobyte block 408 of a first disk 410 with filler data placed in the space that is not occupied by the 512 byte block within the 4 Kilobyte block 408. The 512 byte block 404 is placed in the second 4 Kilobyte block 412 of the first disk 410 with filler data placed in the space that is not occupied by the 512 byte block within the 4 Kilobyte block 412. The first disk 412 is mirrored to a second disk 414, such that the 512 byte blocks with the trailing filler data stored in the first disk 412 are mirrored to a first 4 Kilobyte block 416 and as second 4 Kilobyte block 418 of the second disk 414.

Similarly, in the configuration 420 of the mirrored disk pair, the two 512 byte blocks are each placed with trailing filler data in the second and third 4 Kilobyte blocks 422, 424 of the first disk 426 and the first disk 426 is mirrored in the RAID-10 configuration to the second disk 428. Therefore, only 512 byes of the 4 Kilobyte blocks of the RAID-10 configuration are used for storing data and the remaining space of the 4 Kilobyte blocks are stored with filler data.

Figure 5:
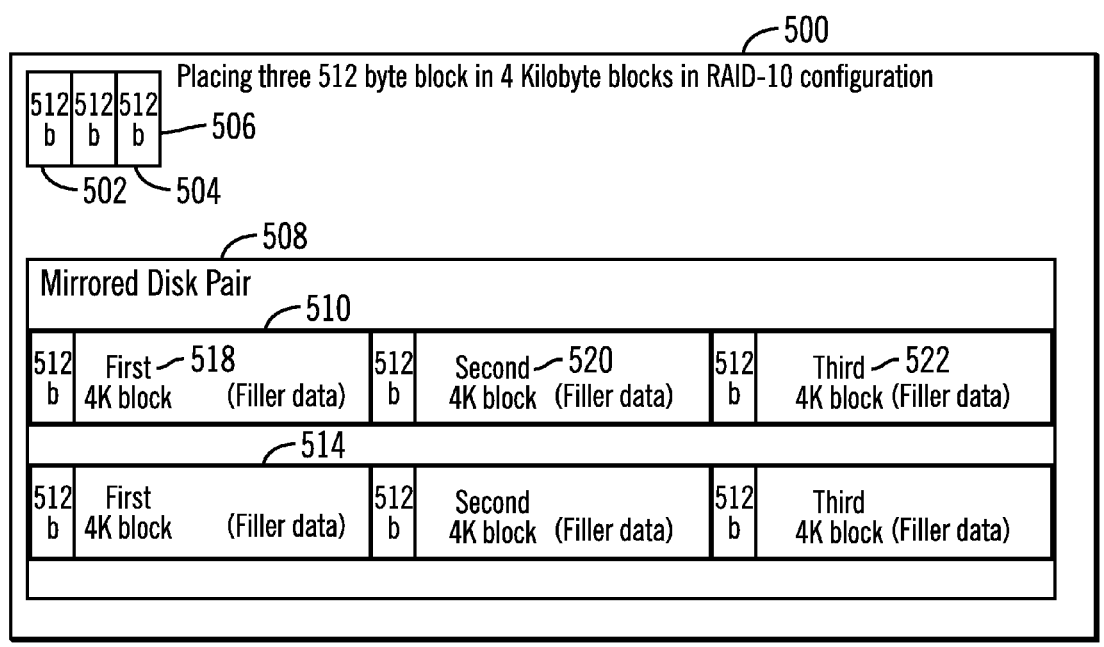
FIG. 5 illustrates a block diagram that shows how three 512 byte blocks are placed in 4 Kilobyte blocks in a RAID-10 configuration, in accordance with certain embodiments.

FIG. 5 illustrates a block diagram 500 that shows how three 512 byte blocks 502, 504, 506 are placed in 4 Kilobyte blocks in a RAID-10 configuration, in accordance with certain embodiments. A mirrored disk pair 508 is comprised of two disks 510, 514, and disk 510 and disk 514 are mirrored to each other. The RAID controller 102 places the 512 byte block 502 in the first 4 Kilobyte block 518, the second 512 byte block 504 in the second 4 Kilobyte block 520, and the third 512 byte block 506 in the third 4 Kilobyte block 522, and in each case filler data is appended at the end of the 512 byte blocks in the empty space trailing each of the 512 byte blocks stored within the 4 Kilobyte blocks. FIG. 5 also shows the placement of the three 512 byte blocks 502, 504, 506 in the second disk 514 that is a mirror of the first disk 510. Therefore, only 512 byes of the 4 Kilobyte blocks of the RAID-10 configuration are used for storing data and the remaining space of the 4 Kilobyte blocks is stored with filler data.

Figure 6:
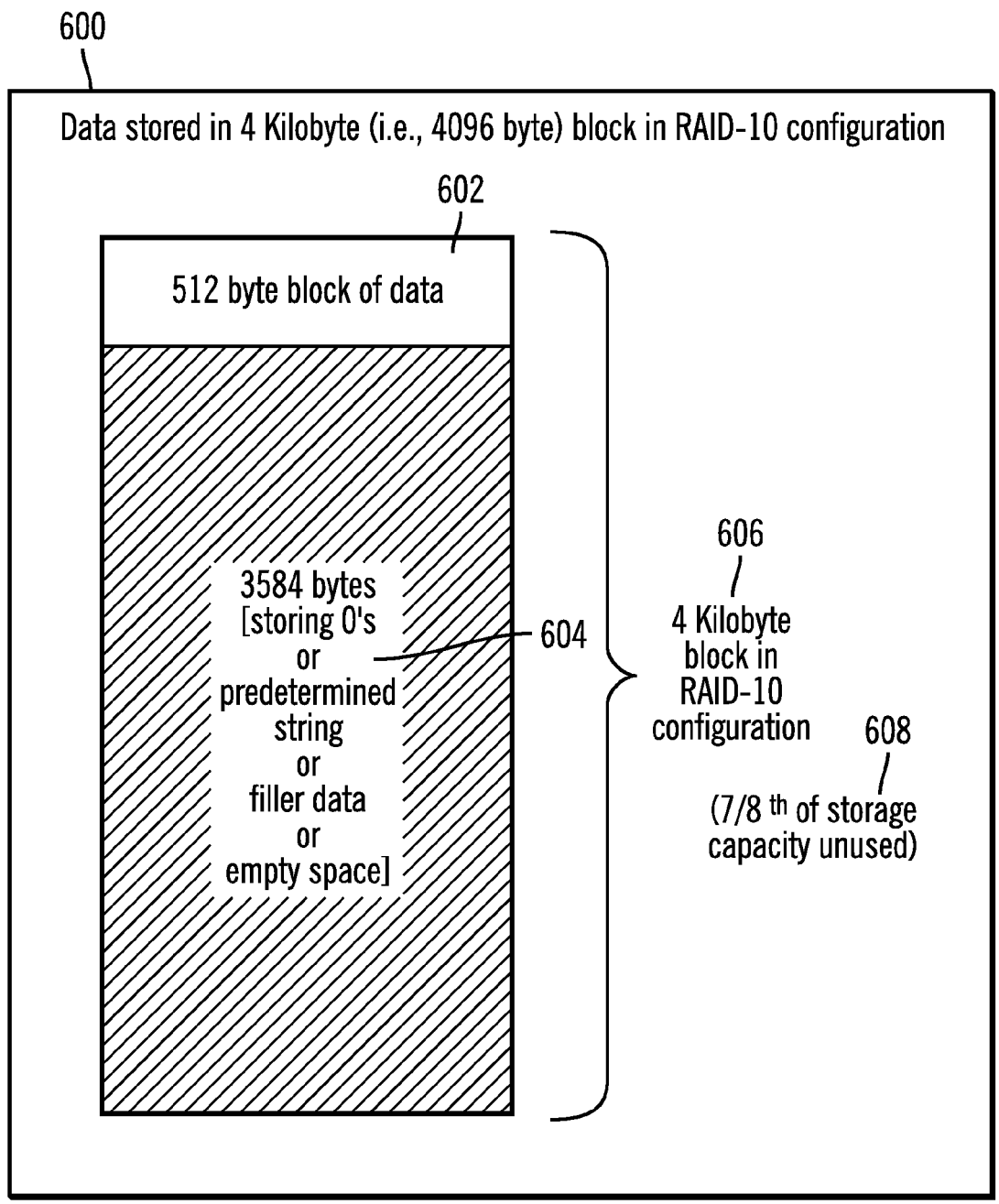
FIG. 6 illustrates a block diagram that shows how a 512 byte block and filler data are stored in a 4 Kilobyte block of a RAID-10 configuration, in accordance with certain embodiments.

FIG. 6 illustrates a block diagram 600 that shows how a 512 byte block 602 and filler data 604 is stored in a 4 Kilobyte block 606 of a RAID-10 configuration, in accordance with certain embodiments.

In FIG. 6, it can be seen that only 512 bytes of the 4096 bytes (4 Kilobytes) are actually used for storing data. The other space which is 3584 bytes is wasted space that is padded with filler data. The filler data may comprise a string of 0's, a repetitive pattern of predetermined strings, etc. Instead of filler data, empty space may also be retained in certain embodiments. Therefore, it is can be seen that 3584 bytes of the 4096 bytes of the 4 Kilobyte blocks of the RAID-10 configured disks are wasted. As a result, seven-eighth of the storage capacity of each 4 Kilobyte block of the disks of the RAID-10 configuration is wasted (shown via reference numeral 608). However, no changes have to be made to any software or firmware resident within the disks of the RAID-10 configuration as the disks continue to operate as before. Data access speed of the RAID-10 configured disks may not be affected adversely, as the 4 Kilobyte blocks contain the 512 byte blocks and each 512 byte block is accessed by reading the corresponding 4 Kilobyte block.

Since RAID-10 is extremely storage inefficient and has an overhead of 50% wasted space by mirroring disks, additional wastage of disk space does not affect the RAID-10 configuration in any significant way. However, data access and retrieval times remain relatively fast and unaffected.

Figure 7:
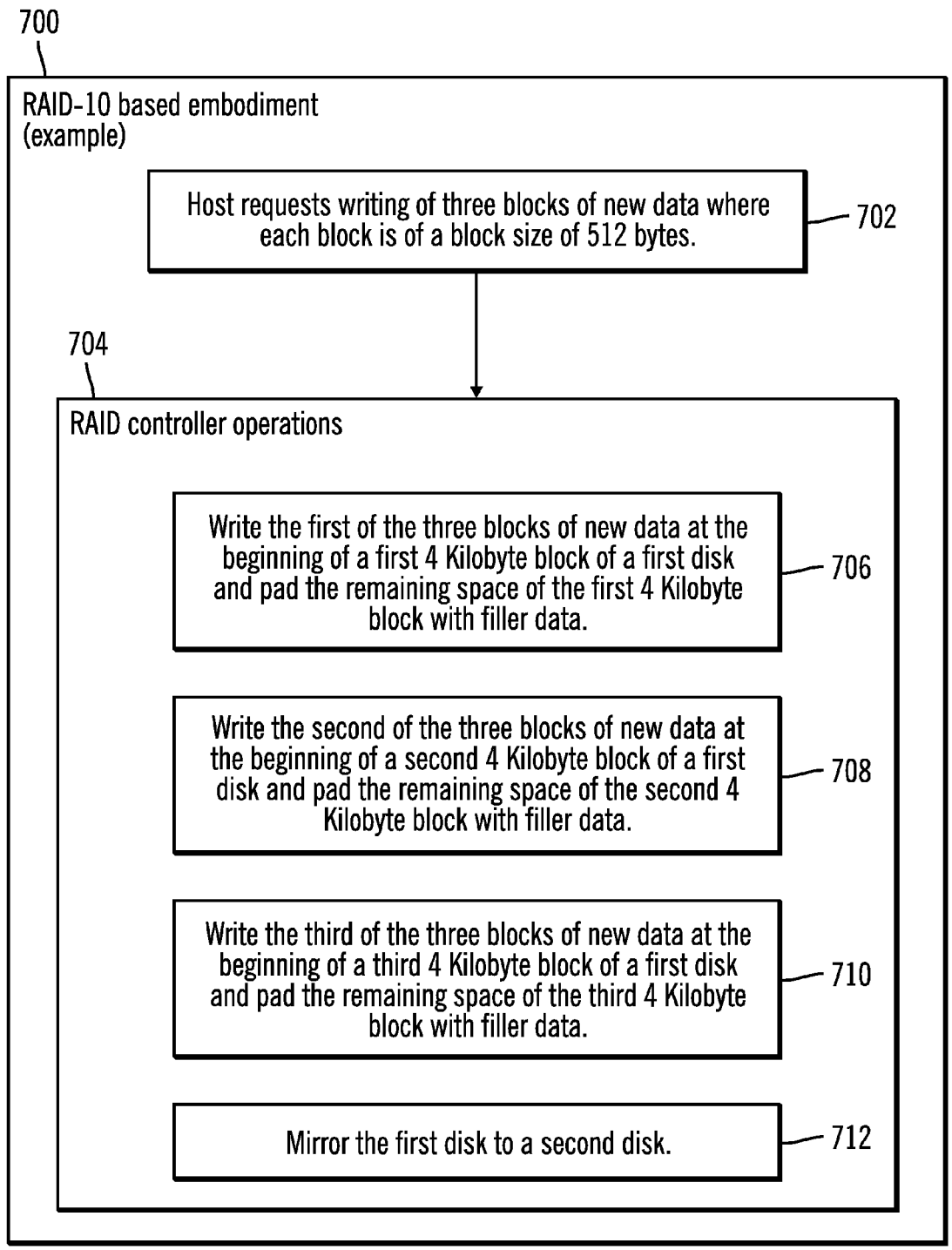
FIG. 7 illustrates a block diagram that shows disk I/O operations performed by the RAID controller controlling a RAID-10 configuration, in accordance with certain embodiments.

FIG. 7 illustrates a block diagram 700 that shows disk I/O operations performed by the RAID controller 102 controlling a RAID-10 configuration of disks, in accordance with certain embodiments.

In certain embodiments, a host 104 requests (reference numeral 702) writing of three blocks of new data where each block is of a block size of 512 bytes. The RAID controller operations that are performed in response to the request from the host 104 are indicated via reference numeral 704.

The RAID controller 102 writes (reference numeral 706) the first of the three blocks of new data at the beginning of a first 4 Kilobyte block of a first disk and pads the remaining space of the first 4 Kilobyte block with filler data.

The RAID controller 102 also writes (reference numeral 708) the second of the three blocks of new data at the beginning of a second 4 Kilobyte block of the first disk and pads the remaining space of the second 4 Kilobyte block with filler data.

Additionally, the RAID controller writes (reference numeral 710) the third of the three blocks of new data at the beginning of a third 4 Kilobyte block of the first disk and pads the remaining space of the third 4 Kilobyte block with filler data. The RAID controller 102 also mirrors (i.e. copies) the first disk to a second disk (reference numeral 712). It may be noted that the operations shown in FIG. 7 corresponds to the placing of three 512 byte blocks shown in FIG. 5.

Figure 8:
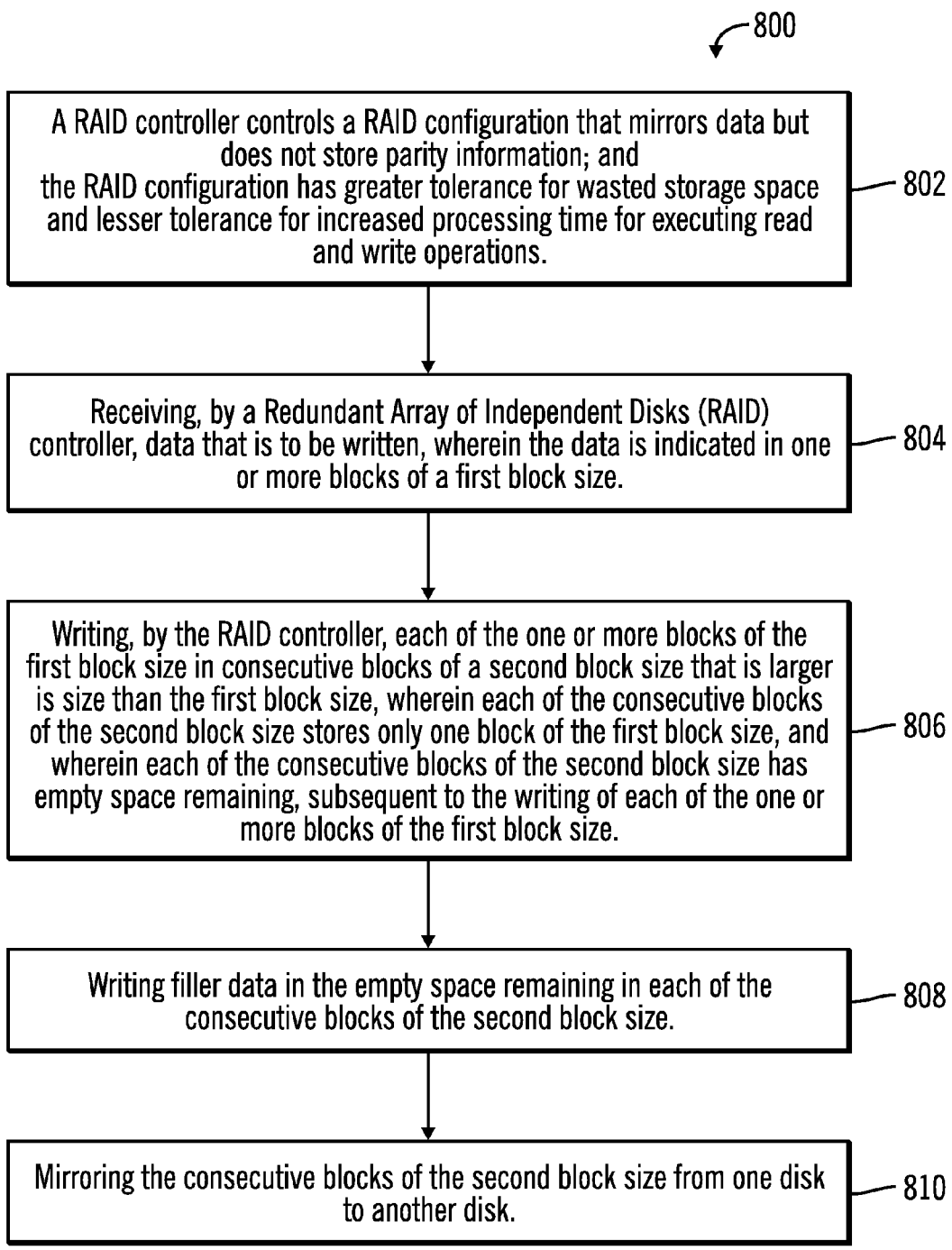
FIG. 8 illustrates a flowchart that shows certain operations, in accordance with certain embodiments.

FIG. 8 illustrates a flowchart 800 that shows certain operations, in accordance with certain embodiments. The operations may be implemented in certain embodiments by the RAID controller 102. In alternative embodiments, the operations shown in FIG. 8 may be implemented in a disk drive or in some other device.

Control starts at block 802 in which the RAID controller 102 controls a RAID configuration 110 that mirrors data but does not store parity information. For example, in certain embodiments the RAID configuration may be RAID-10. Additionally, the RAID configuration has greater tolerance for wasted storage space and lesser tolerance for increased processing time for executing read and write operations.

The RAID controller 102 receives (at block 804) data that is to be written, wherein the data is indicated in one or more blocks of a first block size. In certain embodiments the first block size is 512 bytes, and the data that is received by the RAID controller 102 is from a host 104 whose operating system 108 is configured to access the blocks of the first block size of 512 bytes. The blocks of the first block size of 512 bytes store control key CKD records and each CKD record is aligned to a 512 byte block boundary.

Control proceeds to block 806, in which the RAID controller 102 writes each of the one or more blocks of the first block size in consecutive blocks of a second block size that is larger is size than the first block size. For example, in certain embodiments the second block size is 4 Kilobytes. Each of the consecutive blocks of the second block size stores only one block 602 of the first block size, wherein each of the consecutive blocks of the second block size has empty space remaining, subsequent to the writing of each of the one or more blocks of the first block size.

Filler data 604 is then written (at block 808) by the RAID controller 102, in the empty space remaining in each of the consecutive blocks of the second block size. The consecutive blocks of the second block size are mirrored (at block 810) from one disk to another disk.

Figure 9:
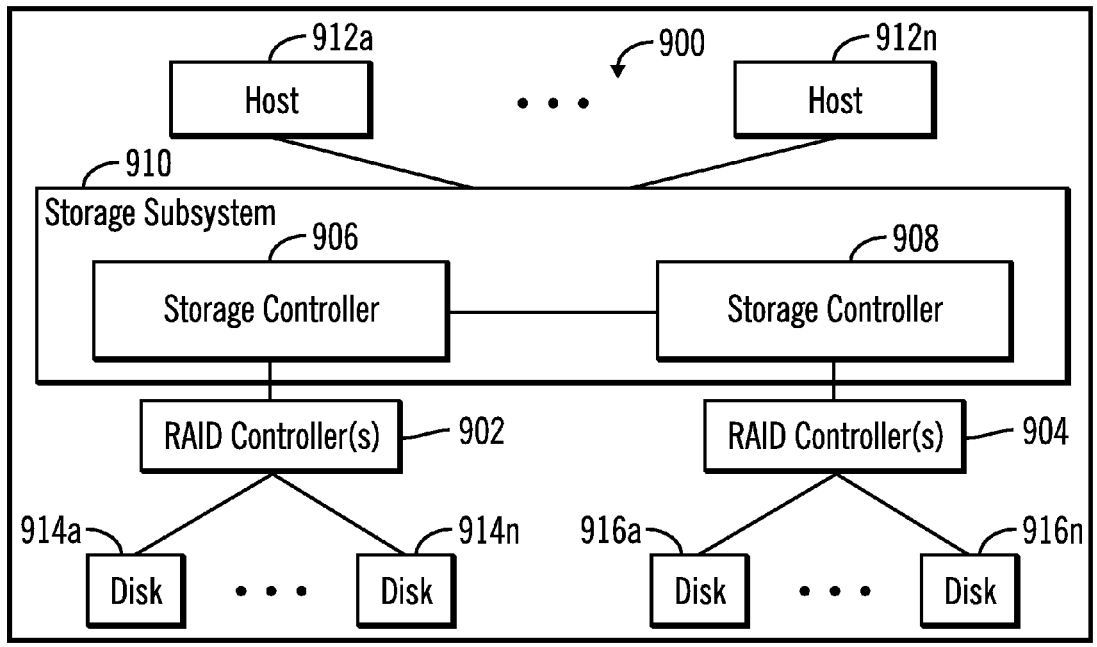
FIG. 9 illustrates a block diagram that shows RAID controllers implemented outside storage controllers, in accordance with certain embodiments.

FIG. 9 illustrates a block diagram 900 that shows RAID controller devices 902, 904 implemented outside storage controllers, in accordance with certain embodiments. The two storage controllers 906, 908 form a storage subsystem 910 that is coupled to a plurality of hosts 912a . . . 912n, wherein at least one or more of the hosts 912a . . . 912n are configured to access data in a block size of 512 bytes. The storage controller 906 is coupled to a RAID controller device 902 that is external to the storage controller 906, and the storage controller 908 is coupled to a RAID controller device 904 that is external to the storage controller 908, wherein the RAID controller devices 902 and 904 control a plurality of disks 914a . . . 914n and 916a . . . 916n respectively, wherein the plurality of disks 914a . . . 914n and 916a . . . 916n store data in 4K block size. The storage controllers 906 and 908 may substitute each other to respond to requests from any of the hosts 912a . . . 912n.

Therefore, FIG. 9 illustrates certain embodiments in which RAID controllers that are external to storage controllers within a storage subsystem map requests of 512 block size to RAID configurations that stores data in a block size of 4 Kilobytes.

Figure 10:
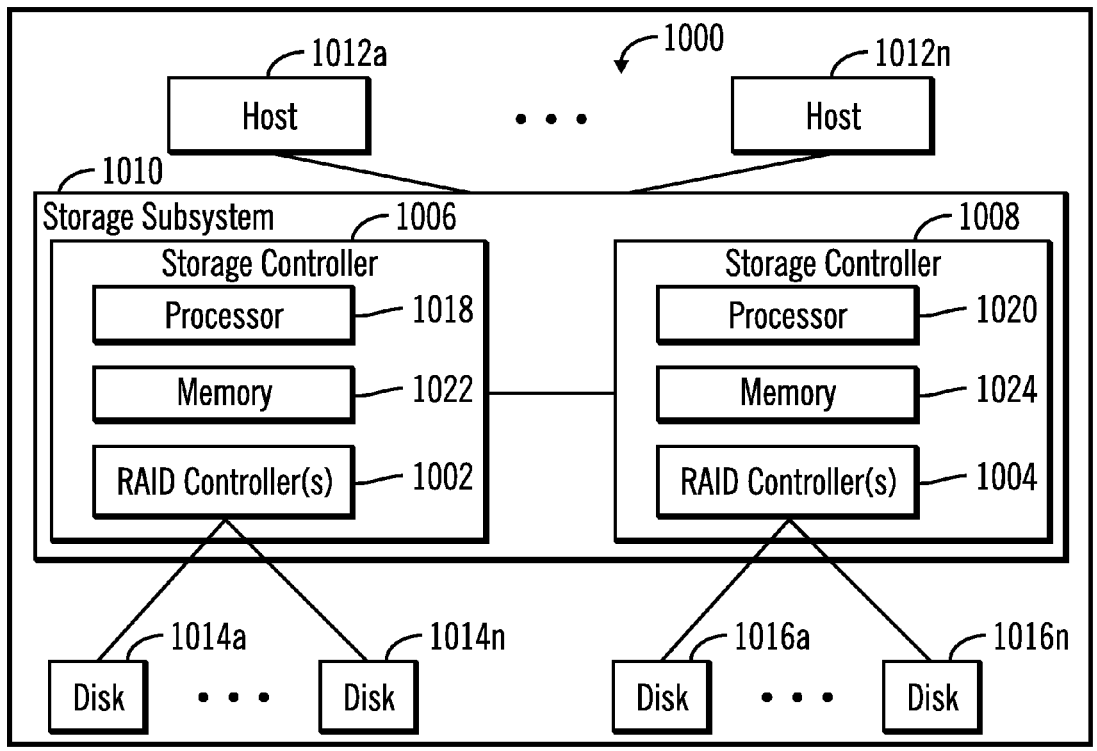
FIG. 10 illustrates a block diagram that shows RAID controllers implemented within storage controllers, in accordance with certain embodiments.

FIG. 10 illustrates a block diagram 1000 that shows RAID controllers 1002, 1004 implemented within storage controllers 1006, 1008, in accordance with certain embodiments. The two storage controllers 1006, 1008 form a storage subsystem 1010 that is coupled to a plurality of hosts 1012a . . . 1012n, wherein at least one or more of the hosts 1012a . . . 1012n are configured to access data in a block size of 512 bytes. The storage controller 1006 is coupled to a RAID controller 1002 that is internal to the storage controller 1006, and the storage controller 1008 is coupled to a RAID controller 1004 that is internal to the storage controller 1008 wherein the RAID controllers 1002 and 1004 control a plurality of disks 1014a . . . 1014n and 1016a . . . 1016n respectively, and wherein the plurality of disks 1014a . . . 1014n and 1016a . . . 1016n store data in 4K block size. The storage controllers 1006 and 1008 may substitute each other to respond to requests from any of the hosts 1012a . . . 1012n and each of then storage controllers 1006, 1008 include at least a processor and a memory (shown via reference numerals 1018, 1020 that indicate processors, and reference numerals 1022, 1024 that indicate memory) in addition to the RAID controllers.

Therefore, FIG. 10 illustrates certain embodiments in which RAID controllers that are internal to storage controllers within a storage subsystem map requests of 512 block size to RAID configurations that stores data in a block size of 4 Kilobytes.

FIGS. 1-10 illustrate certain embodiments, in which a RAID controller maps requests made with a block size of 512 bytes to store data with a block size of 4 Kilobytes in a RAID configuration that mirrors data but does not store parity.

It may be noted that the host does not need to know that the RAID configuration does not natively support the block size used by the host. Additionally, the RAID configuration does not need to know that the host does not natively support the block size used by the RAID configuration to store information in disks.

It may also be noted that in certain embodiments, no extra drive operations are performed in comparison to performing the same writes when the host and RAID configuration are using the same block size.

It may also be noted that in certain embodiments two RAID controllers can share the same disks. For example, in FIG. 9, RAID Controllers 902 and 904 may both share disks 914a . . . 914n. In certain embodiments, just as two storage controllers can substitute each other, so can two RAID controllers.

It may be noted that in certain alternative embodiments, the operations performed by the RAID controller or RAID controllers may instead be performed by a disk drive. The disk drive may have a processor and a memory and may operate to store data in a storage medium. Furthermore, the RAID controllers may in certain embodiments be implemented in hardware, software, firmware, or any combination thereof.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
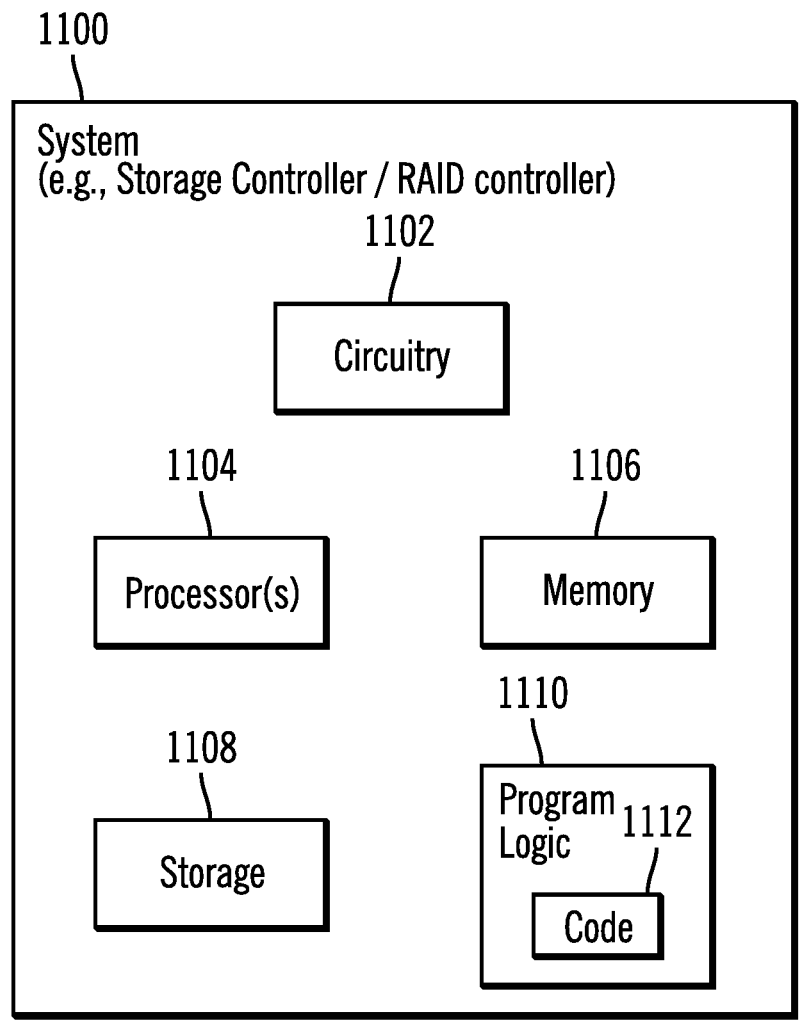
FIG. 11 illustrates a block diagram of a computational system that shows certain elements that may be included in storage controllers or RAID controllers of FIGS. 1, 9, and 10, in accordance with certain embodiments.

FIG. 11 illustrates a block diagram that shows certain elements that may be included in the storage controllers 906, 908, 1006, 1008 or the RAID controller 102, 902, 804, 1002, 1004, in accordance with certain embodiments. The system 1100 may comprise the storage controllers 906, 908, 1006, 1008 or the RAID controllers 102, 902, 904, 1002, 1004 and may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

receiving data that is to be written, from an operating system, by a processor, wherein the processor is coupled to a Redundant Array of Independent Disks (RAID) controller that controls a first storage device and a second storage device, and wherein the data is indicated in one or more blocks of a first block size by the operating system;

writing to the first storage device, by the RAID controller, each of the one or more blocks of the first block size in consecutive blocks of a second block size that is larger in size than the first block size, wherein each of the consecutive blocks of the second block size stores only one block of the first block size, and wherein each of the consecutive blocks of the second block size has empty space remaining, subsequent to the writing of each of the one or more blocks of the first block size, and wherein the empty space remaining in each of the consecutive blocks of the second block size subsequent to the writing of each of the one or more blocks of the first block size is seven-eighth of a storage capacity of each of the consecutive blocks of the second block size;

writing to the first storage device, by the RAID controller, filler data in the empty space remaining in each of the consecutive blocks of the second block size, wherein the filler data comprises a repetitive pattern of predetermined strings, and wherein the RAID controller avoids sending an indication to the operating system that a RAID configuration supported by the RAID controller does not natively support the first block size; and subsequent to writing to the first storage device the filler data in the empty space remaining in each of the consecutive blocks of the second block size, mirroring, by the RAID controller, the consecutive blocks of the second block size from the first storage device to the second storage device.

2. The method of claim 1, wherein:

the first block size is 512 bytes; and the second block size is 4 Kilobytes.

3. The method of claim 2, wherein:

the data is received by the RAID controller from a host in which the operating system is configured to access the blocks of the first block size of 512 bytes; and the blocks of the first block size of 512 bytes store Count-key-data (CKD) records and each CKD record is aligned to a 512 byte block boundary.

4. The method of claim 3, wherein:

the RAID configuration mirrors data but does not store parity information; and during usage, the RAID configuration has greater tolerance for wasted storage space and lesser tolerance for increased processing time for executing read and write operations, wherein the wasted storage space is seven-eighth of the storage capacity of each of the consecutive blocks of the second block size of 4 Kilobytes.

5. The method of claim 4, wherein the RAID controller controls disks that are configured as a RAID-10, the method further comprising:

mirroring the consecutive blocks of the second block size from one disk to another disk.

6. The method of claim 5, wherein:

the RAID controller receives two 512 byte blocks comprising a first 512 byte block and a second 512 byte block;

the RAID controller controls at least a first 4 kilobyte block, a second 4 kilobyte block, and a third 4 kilobyte block, and writes the first 512 byte block in the second 4 kilobyte block, and writes the second 512 byte block in the third 4 kilobyte block.

7. The method of claim 6, wherein the RAID controller is one of two RAID controllers that communicate with the host via a storage subsystem including at least two storage controllers.

8. The method of claim 1, wherein a plurality of blocks of new data are written prior to performing the mirroring.

9. A method for deploying computing infrastructure, comprising integrating computer-readable code into a computational system, wherein the code in combination with the computational system performs operations, the operations comprising:

receiving data that is to be written, from an operating system, by a processor, wherein the processor is coupled to a Redundant Array of Independent Disks (RAID) controller that controls a first storage device and a second storage device, and wherein the data is indicated in one or more blocks of a first block size by the operating system;

writing to the first storage device, by the RAID controller, each of the one or more blocks of the first block size in consecutive blocks of a second block size that is larger in size than the first block size, wherein each of the consecutive blocks of the second block size stores only one block of the first block size, and wherein each of the consecutive blocks of the second block size has empty space remaining, subsequent to the writing of each of the one or more blocks of the first block size, and wherein the empty space remaining in each of the consecutive blocks of the second block size subsequent to the writing of each of the one or more blocks of the first block size is seven-eighth of a storage capacity of each of the consecutive blocks of the second block size;

writing to the first storage device, by the RAID controller, filler data in the empty space remaining in each of the consecutive blocks of the second block size, wherein the filler data comprises a repetitive pattern of predetermined strings, and wherein the RAID controller avoids sending an indication to the operating system that a RAID configuration supported by the RAID controller does not natively support the first block size; and subsequent to writing to the first storage device the filler data in the empty space remaining in each of the consecutive blocks of the second block size, mirroring, by the RAID controller, the consecutive blocks of the second block size from the first storage device to the second storage device.

10. The method for deploying computing infrastructure of claim 9, wherein:

the first block size is 512 bytes; and the second block size is 4 Kilobytes.

11. The method for deploying computing infrastructure of claim 10, wherein:

the data is received by the RAID controller from a host in which the operating system is configured to access the blocks of the first block size of 512 bytes; and the blocks of the first block size of 512 bytes store Count-key-data (CKD) records and each CKD record is aligned to a 512 byte block boundary.

12. The method for deploying computing infrastructure of claim 11, wherein:
   the RAID configuration mirrors data but does not store parity information; and
   during usage, the RAID configuration has greater tolerance for wasted storage space and lesser tolerance for increased processing time for executing read and write operations, wherein the wasted storage space is seven-eighth of the storage capacity of each of the consecutive blocks of the second block size of 4 Kilobytes.

13. The method for deploying computing infrastructure of claim 12, wherein the RAID controller controls disks that are configured as a RAID-10, the operations further comprising:
   mirroring the consecutive blocks of the second block size from one disk to another disk.

14. The method for deploying computing infrastructure of claim 13, wherein:
   the RAID controller receives two 512 byte blocks comprising a first 512 byte block and a second 512 byte block;
   the RAID controller controls at least a first 4 kilobyte block, a second 4 kilobyte block, and a third 4 kilobyte block, and writes the first 512 byte block in the second 4 kilobyte block, and writes the second 512 byte block in the third 4 kilobyte block.

15. The method for deploying computing infrastructure of claim 14, wherein the RAID controller is one of two RAID controllers that communicate with the host via a storage subsystem including at least two storage controllers.

16. The method for deploying computing infrastructure of claim 9, wherein a plurality of blocks of new data are written prior to performing the mirroring.

* * * * *